United States Patent [19]

Mottate

[11] Patent Number: 5,281,031
[45] Date of Patent: Jan. 25, 1994

[54] LINEAR MOTION GUIDE UNIT HAVING A SYNCHRONIZED RETAINER

[75] Inventor: Tatsuo Mottate, Saitama, Japan
[73] Assignee: Nippon Thompson Co., Ltd., Japan
[21] Appl. No.: 38,775
[22] Filed: Mar. 29, 1993

Related U.S. Application Data

[62] Division of Ser. No. 811,521, Dec. 20, 1991.

[30] Foreign Application Priority Data

Dec. 20, 1990 [JP] Japan .............................. 2-403803[U]

[51] Int. Cl.⁵ .............................................. F16C 29/04
[52] U.S. Cl. ......................................... 384/47; 384/57
[58] Field of Search ........................ 384/47, 57, 18, 19, 384/43, 50

[56] References Cited

U.S. PATENT DOCUMENTS 3,857,618 12/1974 Hagen .................................... 384/18
4,109,973 8/1978 Terada .................................... 384/57
4,215,904 8/1980 Teramachi ............................. 384/47
4,961,648 10/1990 Röck ..................................... 384/19

*Primary Examiner*—Lenard A. Footland
*Attorney, Agent, or Firm*—Skjerven, Morrill, MacPherson, Franklin & Friel

[57] ABSTRACT

A linear motion guide unit includes a pair of guide members each formed with a guide groove and provided to be relatively movable parallel with a longitudinal axis of the unit. A plurality of rolling members are provided in rolling contact with the guide grooves of the guide members. A retainer assembly, including a retainer plate formed with a plurality of windows and at least one grooved wheel mounted at one end of the retainer plate, is disposed in a space defined between the guide grooves. A wire is passed around the grooved wheel and fixedly attached to the guide members. The total length of the retainer assembly is shorter than either of the guide members.

5 Claims, 3 Drawing Sheets

LINEAR MOTION GUIDE UNIT HAVING A SYNCHRONIZED RETAINER

This application is a division of application Ser. No. 07/811,521, filed Dec. 20, 1991.

BACKGROUND OF THE INVENTION

1. Field of the Invention

This invention generally relates to a linear motion guide unit, and, in particular, to such a linear motion guide unit including a retainer which retains rolling members in position and which is moved in synchronism with a bed and a table.

2. Description of the Prior Art

A linear motion rolling contact guide unit is well known in the art and it typically includes a bed, a table, a plurality of rolling members, such as balls or rollers, interposed between the bed and the table and a retainer for retaining the rolling members in position between the bed and the table. Also known is such a linear motion guide unit including a belt for preventing the retainer from being shifted in position as disclosed in the Japanese patent Laid-open Pub. No. 56-113824. In this unit, however, since a pair of pulleys is disposed on both ends of the retainer and the top and bottom transfer surfaces are connected by belts via respective belts, whereby the movement of the retainer is limited to a half of the bearing unit or guide unit itself through the pulleys and belts and the belts also serve as dust covers.

However, in the prior art structure utilizing belts for preventing the retainer from shifting in position, since the pulleys are disposed outside of the bed and the table, the overall length of the bearing unit or guide unit tends to become excessively long. Besides, in the prior art device, since a pulley is provided at each end of the retainer, the total length of the retainer tends to be longer and the weight of each of these pulleys is added to the bearing unit or guide unit, so that the retainer is more susceptible to deformations and there is also a disadvantage of an increase in the partial abnormal wear and sliding resistance.

SUMMARY OF THE INVENTION

In accordance with one aspect of the present invention, there is provided an improved linear motion guide unit which generally includes a pair of elongated guide members, each formed with a guide groove located opposite to each other, a plurality of rolling members partly received in the guide groove of each of the guide members, an elongated retainer for retaining the rolling members in position and spaced apart from one another, a pair of rotary members disposed at opposite ends of the retainer, an endless wire extended between the pair of rotary members, a first attaching means for attaching said wire to one of said pair of guide members and a second attaching means for attaching said wire to the other of said pair of guide members. The total longitudinal length of the retainer assembly, including the rotary members, is shorter than the longitudinal length of either of the pair of guide members.

In accordance with another aspect of the present invention, there is provided a linear motion guide unit which generally includes a pair of elongated guide members, each formed with a guide groove located opposite to each other, a plurality of rolling members partly received in both of the guide grooves, an elongated retainer for retaining the rolling members in position and spaced apart from one another, a rotary member rotatably provided at one end of the retainer, and a wire having one end fixedly attached to one of the pair of guide members and other end fixedly attached to the other of the pair of guide members with its intermediate portion passed around the rotary member, whereby the retainer is normally biased in a direction from its end where the rotary member is provided to other end where no such rotary member is provided. In this structure also, the total length of the retainer assembly, including the rotary member, is set to be shorter than the longitudinal length of each of the pair of guide members.

It is therefore a primary object of the present invention to provide an improved linear motion guide unit high in performance and reliable and smooth in operation.

Another object of the present invention is to provide an improved linear motion guide unit capable of preventing its retainer from being shifted in position.

A further object of the present invention is to provide an improved linear motion guide unit free of changes in sliding resistance, free of modifications of the unit and free of the occurrence of partial abnormal wear.

A still further object of the present invention is to provide an improved linear motion guide unit having a synchronized retainer compact in size and simple in structure.

Other objects, advantages and novel features of the present invention will become apparent from the following detailed description of the invention when considered in conjunction with the accompanying drawings.

DESCRIPTION OF THE PREFERRED EMBODIMENTS

Figure 1:
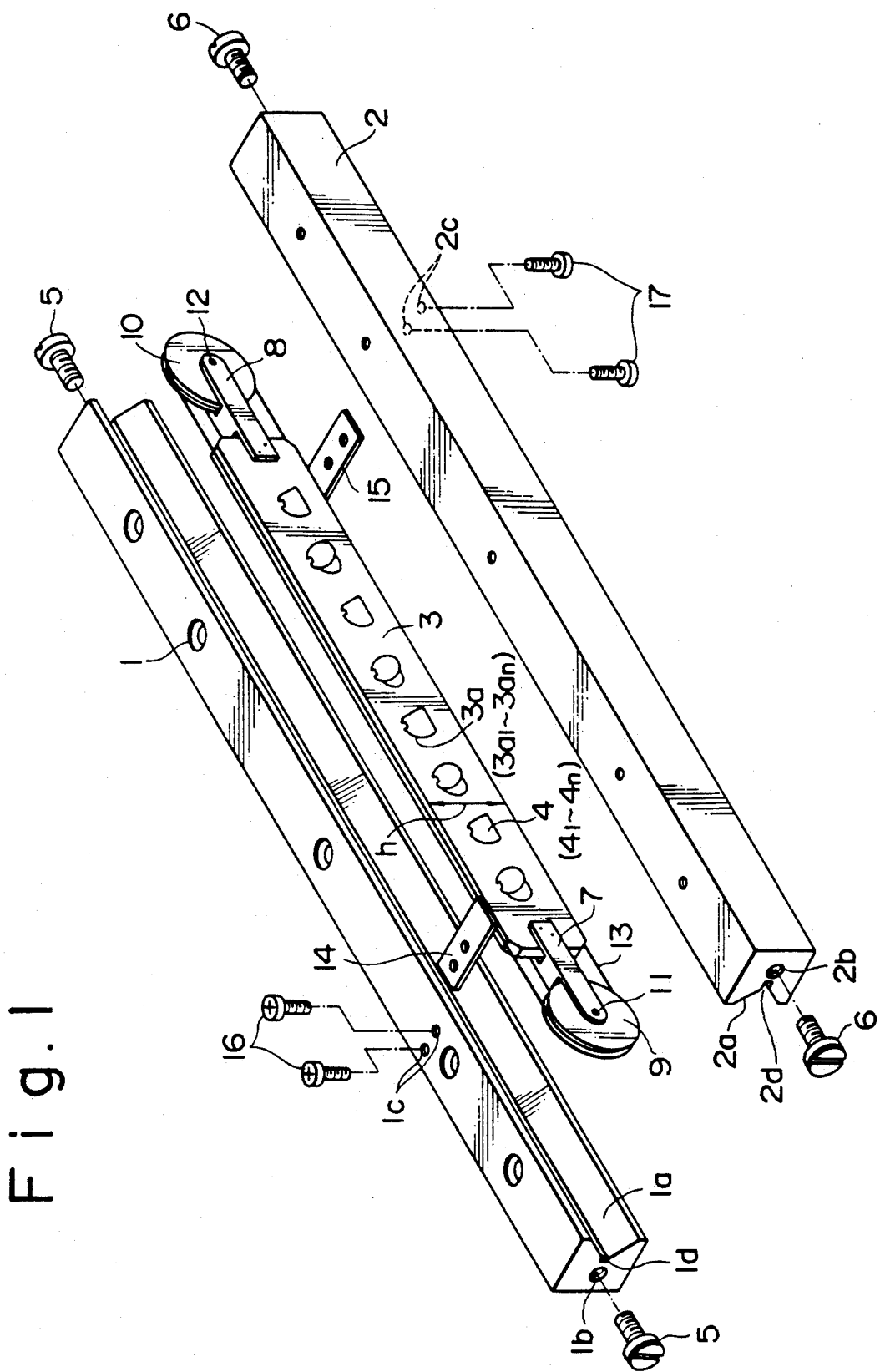
FIG. 1 is a schematic illustration showing in exploded, perspective view a linear motion guide unit constructed in accordance with one embodiment of the present invention.

Referring now to FIG. 1, there is schematically shown a linear motion guide unit constructed in accordance with one embodiment of the present invention. As shown, the present linear motion guide unit generally includes a pair of elongated guide members 1 and 2, which are identical in structure in this embodiment. Each of the guide members 1 and 2 is generally rectangular in cross section and is provided with a plurality of threaded holes at its top and/or bottom surface for mounting on a desired object. Each of the guide members 1 and 2 is formed with a guide groove 1a or 2a at its opposite side surface. In the present embodiment, the guide groove 1a or 2a has a V-shaped cross section. When assembled, the guide grooves 1a and 2a are located opposite to each other to define a guide channel therebetween.

A plurality of rolling members 4, or rollers in the present embodiment, are provided in the guide channel to thereby provide a rolling contact between the left and right guide members 1 and 2. In the present embodiment, the rollers 4 are provided in the so-called crossed arrangement, so that any two adjacent rollers 4 are oriented to extend their rotating axes perpendicular to each other when viewed in the longitudinal direction.

Also provided between the left and right guide members 1 and 2 is a retainer plate 3 which is elongated and formed with a plurality of windows $3a$, such as $3_1$ - $3a_n$, for receiving therein respective rollers 4 in predetermined orientation to define the so-called crossed arrangement. With this arrangement, the linear motion guide unit can sustain a load in any direction and provide a rigid structure with a minimum amount of elastic deformation. Each of the rollers 4, or $4_1$ - $4_n$ in the illustrated embodiment, retained by the retainer $3a$ in position may rotate or roll within its window $3a$ while keeping a rolling contact with each of the guide grooves $1a$ and $2a$.

The retainer plate 3 is provided with a holding member 7 or 8 at each end for holding a wheel 9 or 10 rotatably. Described more in detail, the holding member 7 or 8 is generally H-shaped and its one bifurcated end is fixedly attached to a corresponding end of the retainer plate 3 and its other bifurcated end is provided with a pin 11 or 12 at its free end with the wheel 9 or 10 being provided to be rotatable around the corresponding pin 11 or 12. Each of the wheels 9 and 10 is formed with a groove along its peripheral surface and an endless wire 13 is extended between the wheels 9 and 10. The wheels 9 and 10 have such a diameter that the distance between the forward and backward runs of the endless wire 13 is larger than the height of the retainer plate 3 so as to prevent the wire 13 from coming into contact with the retainer plate 3.

Figure 2:
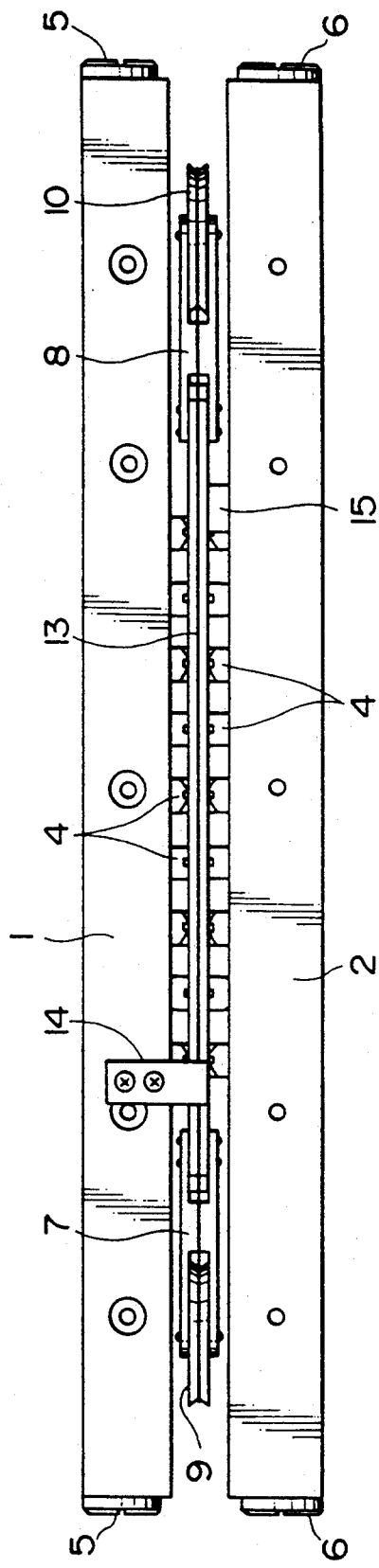
FIG. 2 is a schematic illustration showing in plan view the linear motion guide unit of FIG. 1.

Of importance, a retainer assembly including the retainer plate 3 and a pair of wheels 9 and 10, is so structured to have a total length which is shorter than the guide members 1 and 2, so that the retainer assembly is completely located in a space defined by the opposed guide grooves $1a$ and $2a$ when the guide members 1 and 2 are located at its home position, as best shown in FIG. 2.

A top connection plate 14 has its one end fixedly attached to a first point on the endless wire 13 and has its other end fixedly attached to the left guide member 1 by means of screws 16 threaded into threaded holes $1c$ provided in the left guide member 1. Similarly, a bottom connection plate 15 has its one end fixedly attached to a second point on the endless wire 13 and has its other end fixedly attached to the right guide member 2 by means of screws 17 threaded into threaded holes $2c$ provided in the right guide member 2. In this manner, the left guide member 1 is operatively coupled to the endless wire 13 via the top connection plate 14 and the right guide member 2 is operatively coupled to the endless wire 13 via the bottom connection plate 15.

Also provided in the guide members are end screws 5 and 6 which are screwed into threaded holes $1b$ and $2b$, respectively, to thereby serve as stoppers for limiting the movement of the retainer 3 in the longitudinal direction. That is, the heads of screws 5 and 6 define end walls at each end of the guide grooves $1a$ and $2a$ so as to come into engagement of the roller 4 located at the far end to prevent the retainer 3 from slipping away from the guide channel defined between the guide grooves $1a$ and $2a$. Also provided in each of the guide grooves $1a$ and $2a$ is a relief recess $1d$ and $2d$, respectively, which may serve to receive therein the tip end of the inclined roller 4, thereby allowing to maintain the orientation of the roller 4 in a predetermined fashion.

In operation, when one of the right and left guide members 1 and 2 is driven to move in a direction parallel to the longitudinal axis of the unit relative to the other of the right and left guide members 1 and 2, the endless wire 13 also starts to travel along its endless path passing around the wheels 9 and 10 since the guide members 1 and 2 are fixedly attached to the endless wire 13 via the connection plates 14 and 15, respectively. Suppose that the right guide member 2 is fixedly attached to a stationary object and the left guide member 1 is moved linearly to left bottom in FIG. 1, the endless wire 13 travels counterclockwise since the top connection plate 14 fixedly attached to both of the left guide member 1 and the endless wire 13 also moves toward left bottom. While, the other bottom connection plate 15 remains stationary since it is fixedly attached to the stationary right guide member 2. Accordingly, when the left guide member 1 moves over a distance L relative to the right guide member 2, the retainer plate 3 moves only a half of distance L, i.e., L/2, relative to the right guide member 2. In this manner, the movement of the retainer plate 3 is always controlled by and synchronized with the movement of one of the right and left guide members 1 and 2 relative to the other. Therefore, since the movement of the retainer plate 3 is always controlled, there is no chance that the retainer plate 3 would be shifted in position even if a relative movement is produced between the left and right guide members 1 and 2 frequently.

In the above-described embodiment, the guide members 1 and 2 are disposed horizontally. However, these paired guide members 1 and 2 may be disposed in any other arrangement, if desired. For example, these guide members 1 and 2 may be disposed one on top of the other as spaced apart from each other.

Figure 4:
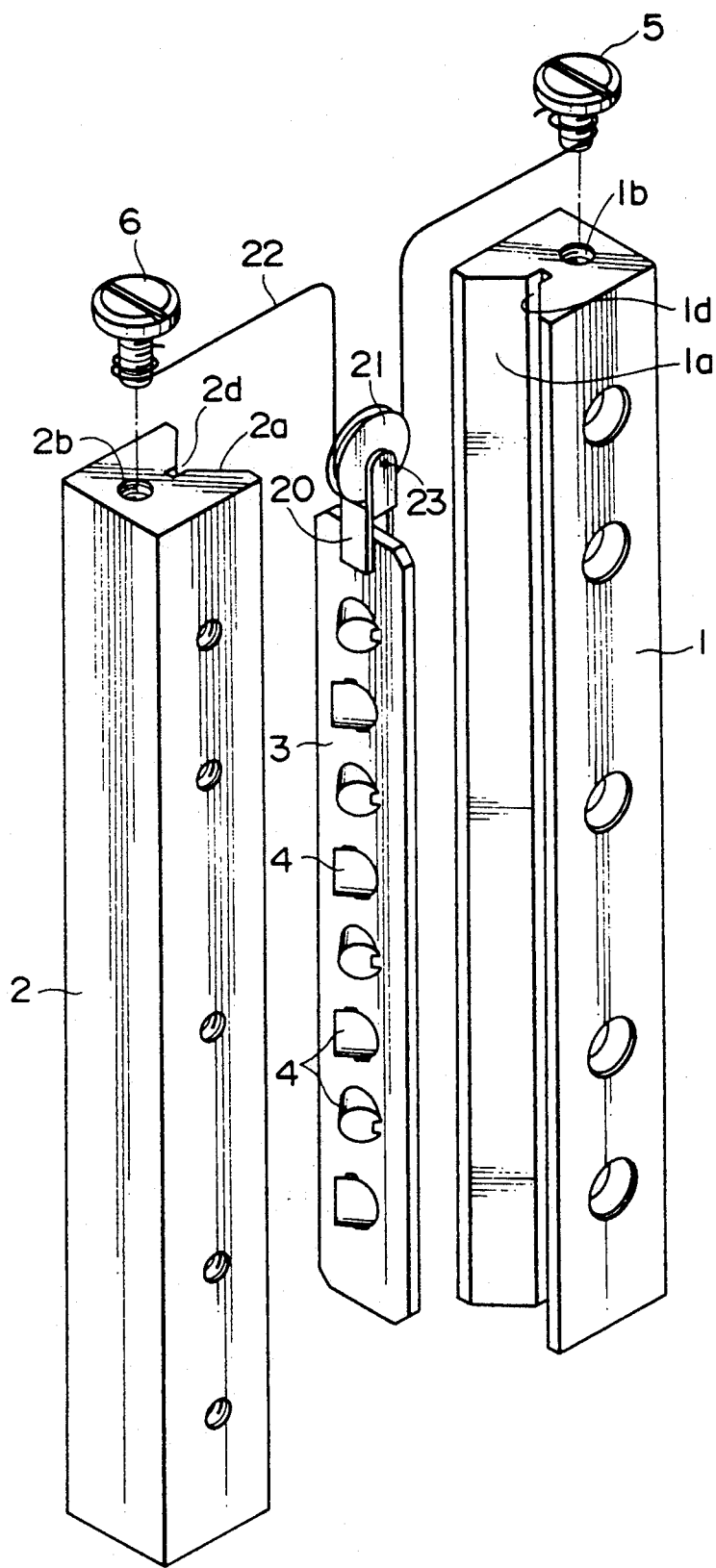
FIG. 4 is a schematic illustration showing in exploded, perspective view a linear motion guide unit constructed in accordance with another embodiment of the present invention.

Referring now to FIG. 4, there is schematically shown a linear motion guide unit constructed in accordance with another embodiment of the present invention, which is similar in many respects to the above-described embodiment, so that like numerals indicate like elements.

Figure 3:
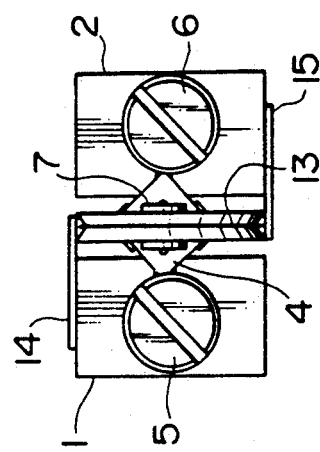
FIG. 3 is a schematic illustration showing in end view the linear motion guide unit of FIG. 1.

FIG. 4 illustrates a particular embodiment when a pair of elongated guide members 1 and 2 is arranged vertically. Thus, these guide members 1 and 2 are similar in structure and function to those guide members 1 and 2 shown in FIGS. 1 through 3 excepting the fact that they are arranged vertically. Between the guide members 1 and 2 is arranged a retainer plate 3 which is also similar in structure to the previously described retainer plate 3 shown in FIGS. 1 through 3.

In the embodiment shown in FIG. 4, however, a wheel 21 is provided only at one end, or top end in the illustrated embodiment, of the retainer plate 3, and the wheel 21 is provided at the top end of the retainer plate 3 through a holding member or bracket 20 such that the rotating axis of the wheel 21 is substantially in parallel with the plane of the retainer plate 3. For this purpose, the holding member 20 has one end fixedly attached to the top end of the retainer plate 3 and provided with a pin 23 which extends in a direction parallel with the plane of the retainer plate 3 and which supports the wheel 21 rotatably therearound. The wheel 21 is provided with an outer peripheral groove along its peripheral surface for guiding a wire 22. The wire 22 has one end fixedly attached to the top end of the guide member 1 by means of an end screw 5 and other end fixedly attached to the top end of the guide member 2 by means of an end screw 6. The intermediate portion of the wire 22 is passed around the wheel 21, so that the retainer assembly including the retainer plate 3 and the wheel 21 is suspended by the wire 22. In this embodiment, the wheel 21 is disposed in the space defined by the guide grooves 1a and 2a of the respective guide members 1 and 2 and the wire 22 is guided and received in the respective relief recesses 1d and 2d of the guide members 1 and 2.

With the above-described embodiment, the wire suspends the retainer assembly including the retainer plate 3 and the wheel 21 against the gravity force to keep the retainer assembly in position. And, when one of the guide members 1 and 2 is caused to move vertically relative to the other, the retainer plate 3 is controlled to move over a distance which is only a half of the distance travelled by one of the guide embers 1 and 2 relative to the other. In this manner, the movement of the retainer plate 3 is always controlled and limited to a half of a relative distance travelled between the guide members 1 and 2.

In the above-described particular embodiment shown in FIG. 4, use is made of the gravity force to keep the retainer plate 3 urged in one particular direction. However, alternatively, use may also be made of any other means or structures for keeping the retainer plate 3 urged in one particular direction. For example, use may be made of an elastic or resilient means, such as rubber or springs, to keep the retainer plate 3 urged or biased in one particular direction. In such alternative structured, the guide unit shown in FIG. 4 may also be disposed horizontally instead of the illustrated vertical arrangement.

Moreover, in the above-described embodiments, use has been made of wheels or pulleys as rotary members, however, as an alternative structure, use may also be made of a pin. In addition, use may also be made of a belt instead of wire. Besides, in the above-described embodiments, rollers have been used as rolling members. In the case of using balls as rolling members, however, the cross sectional shape of each of the guide grooves 1a and 2a must be varied correspondingly.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion guide unit, comprising:
   a pair of elongated guide members, which are provided to be relatively movable in parallel with a longitudinal axis of said unit, each of said pair of guide members being formed with a guide groove having a predetermined cross sectional shape;
   a plurality of rolling members disposed in a space defined by and in rolling contact with the guide grooves of said pair of guide members;
   a retainer assembly movably disposed in said space for retaining said plurality of rolling members spaced apart from one another and in position, said retainer assembly including an elongated retainer member and a grooved rotating member rotatably provided at one end of said retainer member, a total length of said retainer assembly being less than each of said pair of guide members;
   a wire having one end fixedly attached to one of said pair of guide members and other end fixedly attached to the other of said pair of guide members with an intermediate portion of said wire being passed around said grooved rotating member; and
   urging means for normally urging said retainer assembly in a predetermined direction along a longitudinal axis of said unit.

2. The guide unit of claim 1, wherein said pair of guide members are vertically arranged and said urging means is a gravity force for pulling said retainer assembly in a downward direction.

3. The guide unit of claim 1, wherein said pair of said guide members are vertical arranged and said ends of said wire are fixedly attached to top ends of said pair of guide members, respectively.

4. The guide unit of claim 1, wherein said retainer member is a flat plate formed with a plurality of windows for partly receiving therein said plurality of rolling members, respectively.

5. The guide unit of claim 4, wherein said groove rotating member is rotatably mounted at one end of said plate with its rotating axis extending in parallel with a plane of said plate.

* * * * *